UNITED STATES PATENT OFFICE.

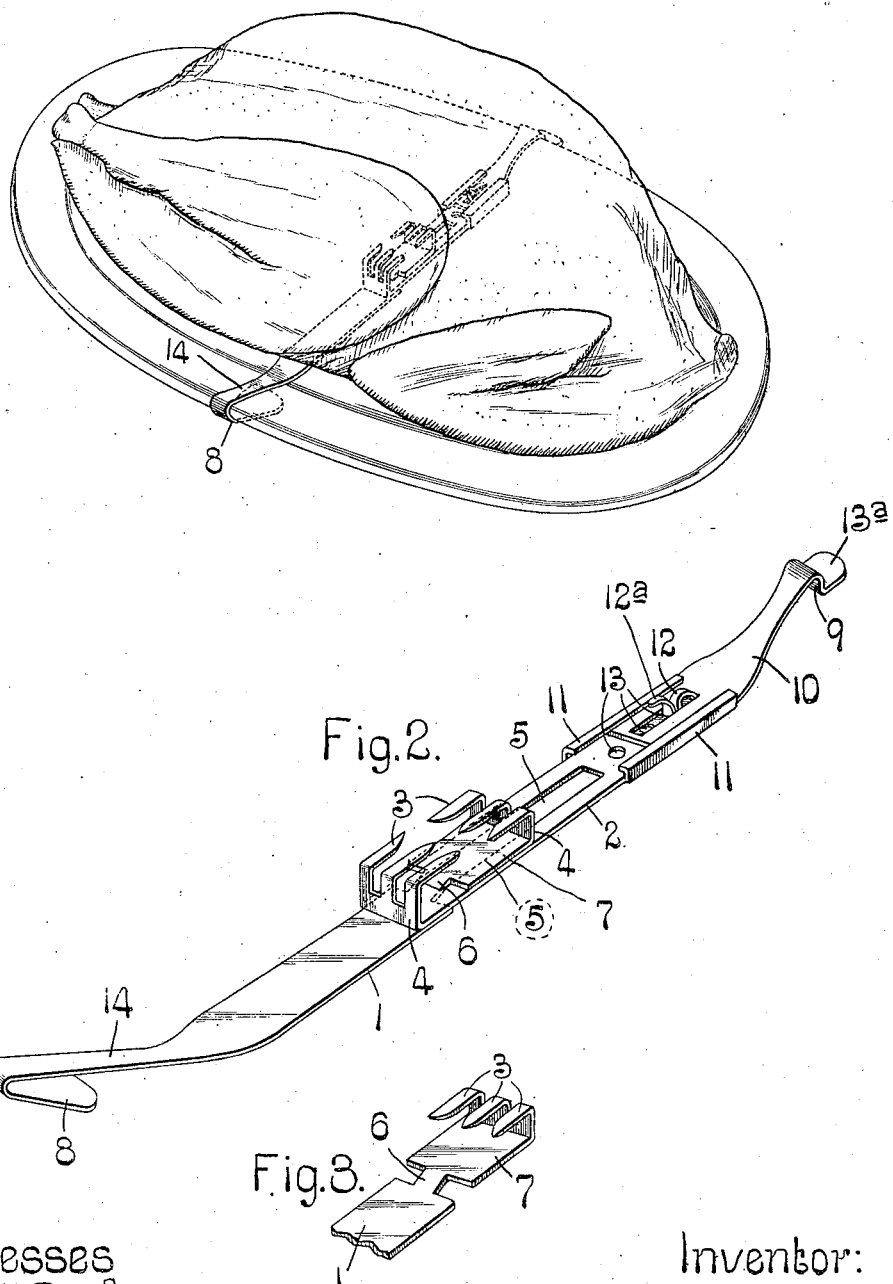

GEORGE W. HAVERSTICK, OF ST. LOUIS, MISSOURI.

FOWL OR MEAT HOLDER.

No. 877,331.　　　Specification of Letters Patent.　　　Patented Jan. 21, 1908.

Application filed February 18, 1907. Serial No. 358,044.

*To all whom it may concern:*

Be it known that I, GEORGE W. HAVERSTICK, a citizen of the United States, residing at St. Louis, Missouri, have invented a certain new and useful Improvement in Fowl or Meat Holders, of which the following is a full, clear, and exact description, such as will enable others skilled in the art to which it appertains to make and use the same, reference being had to the accompanying drawings, forming part of this specification, in which—

Figure 1 is a perspective view showing my device applied to a platter for holding a fowl in position to be carved; Fig. 2 is a perspective view of my improved device; and Fig. 3 is a detail view of one member of the device.

This invention relates to devices for holding fowls or roasts of meat in position on a platter while they are being carved.

The main object of my invention is to provide a device of the character described which is so constructed that it will firmly grasp the back-bone of a fowl and thus securely hold the fowl in position with its breast presented upwardly.

Another object of my invention is to provide a device of simple construction that can be manufactured at a small cost and which can be cleaned easily. Other desirable features of my invention will be hereinafter pointed out.

Referring to the drawings which represent the preferred form of my invention, 1 and 2 designate two members that are preferably formed from sheet metal and which are provided at their inner ends with coöperating prongs 3 formed integral with upwardly extending portions 4 at the inner ends of said members. These prongs 3 lie in a horizontal plane above the members 1 and 2 and extend toward each other so that a sufficient space will be provided between the prongs and the upper surfaces of said members to receive the back-bone of the fowl. The members 1 and 2 are interlocked at their inner ends and are in sliding engagement with each other so that the prongs can be separated to permit the fowl to be placed between them, the prongs being thereafter moved together to cause them to penetrate the back of the fowl. This interlocking and sliding engagement of the members 1 and 2 is effected by providing one of said members, preferably the member 2, with an elongated slot 5 and the coöperating member 1 with a contracted portion or web 6 that is bent upwardly and arranged in said slot, the part 7 of the member 1 beyond this contracted portion or web lying in a higher horizontal plane than the main portion of said member so that when the members 1 and 2 are assembled, as shown in Fig. 2, the main portion of the member 1 will be arranged underneath the member 2, and the part 7 of the member 1 will be arranged above the member 2.

The normal position of the device, that is to say, when it is in engagement with the fowl, is illustrated in Fig. 2 and also in broken lines in Fig. 1, the contracted web 6 of the member 1 engaging the inner end of the slot 5 in the member 2. The members 1 and 2 are provided at their outer ends with devices that engage the edge portion of the platter so as to prevent the prongs from moving either transversely or longitudinally of the platter, one of said members, preferably the member 2, having an adjustable clamping or engaging device.

In the preferred form of my invention as herein shown, these engaging devices consist of a hook 8 at the outer end of the member 1 which fits over or incases the edge portion or rim of the platter and a hook 9 at the outer end of the member 2 which engages the opposite edge of the platter. The hook 9 is formed on a separate piece 10 that is slidingly arranged in flanges 11 on the member 2 and said piece is provided with a yielding tongue 12 that enters openings 13 in the member 2. The yielding tongue is preferably provided with a finger-piece 12$^a$ and is formed integral with the piece 10 and at the outer end of said piece is a finger-piece 13$^a$ that is grasped and moved upwardly when the holder is to be removed from the platter. A plurality of holes 13 are formed in the member 2 so that the position of the part 10 can be changed to move the engaging devices 8 and 9 toward and away form each other to accommodate platters of different diameters.

The members 1 and 2 are preferably formed from steel or some other metal that is resilient and the outer end portion of the member 1 is inclined upwardly at 14 so that the main portion of said member will lie flat on the platter and be held in intimate contact therewith by the resiliency of the metal from which it is formed. The device can be manufactured at a small cost as it can be stamped out of sheet metal and bent into the proper shape. The members 1 and 2 can be disengaged from each other by turning the member 1 at right angles to the member 2 and then drawing said member 1 downwardly through the elongated slot in the member 2, thereby permitting the device to be cleaned easily. As the prongs 3 engage the back-bone of the fowl and as the device is clamped securely to the platter the fowl will be prevented from movement and will be arranged with its breast presented upwardly.

While the device herein shown is intended to be used principally for holding a fowl in position during the operation of carving same it could, of course, be used for holding a roast of meat or any other object.

Having thus described my invention, what I claim as new and desire to secure by Letters Patent is:

1. A device of the character described, comprising two members in sliding engagement with each other and having their inner ends overlapped, the upper one of said members being provided with a slot and the under member having a portion which extends through said slot, the inner end portion of said under member resting on the top face of the slotted member, a prong at the inner end of each member projecting toward the outer end of the member, and devices at the outer ends of said members for engaging the edge portion of a platter; substantially as described.

2. A device of the character described, comprising a member provided with an elongated slot, a member having a portion lying above and a portion lying below the member first referred to, said portions being connected by a web that is arranged in said slot, cooperating prongs at the inner ends of said members, and means for securing said members to a plate or similar article; substantially as described.

3. A device of the character described, comprising a member provided with an elongated slot, a member having a web arranged in said slot and comprising portions which engage the upper and underneath faces of the member first referred to, means at the inner ends of said members for engaging the object to be carved, and means for securing said members to a plate or similar article; substantially as described.

4. A device of the character described, comprising two members in sliding engagement with each other and provided at their inner ends with prongs which project toward each other, one of said members being provided with flanges, a piece arranged between said flanges and having a hooked portion for engaging the edge of a dish, and a yielding tongue on said piece for engaging an opening in the member on which it is mounted; substantially as described.

In testimony whereof I hereunto affix my signature in the presence of two witnesses, this sixteenth day of February, 1907.

GEORGE W. HAVERSTICK.

Witnesses:
WELLS L. CHURCH,
GEORGE BAKEWELL.